United States Patent [19]

Mueller et al.

[11] Patent Number: 4,468,712
[45] Date of Patent: Aug. 28, 1984

[54] POSITIONER APPARATUS FOR TAPE RECORDER HEADS

[75] Inventors: Joseph H. Mueller, Tecumseh; Ronald G. Dawson; Samuel N. Irwin, both of Ann Arbor, all of Mich.

[73] Assignee: Irwin International, Inc., Ann Arbor, Mich.

[21] Appl. No.: 280,139

[22] Filed: Jul. 2, 1981

[51] Int. Cl.³ .......................... G11B 5/55; G11B 21/08
[52] U.S. Cl. ........................................ 360/106; 360/78
[58] Field of Search ............... 360/104, 105, 106, 107, 360/108, 109, 78

[56] References Cited

U.S. PATENT DOCUMENTS 4,024,582  5/1977  Ban et al. .............................. 360/106
4,275,427  6/1981  Bjordahl .............................. 360/106

Primary Examiner—Robert L. Richardson
Attorney, Agent, or Firm—Price, Heneveld, Huizenga & Copper

[57] ABSTRACT

A positioner apparatus for moving a transducer head from one to another of a number of parallel tracks extending lengthwise along a recording tape, including a rotary cam with surfaces defining an inclined plane, a cam follower for riding upon such surfaces, a transducer carrier or mount coupled to the cam follower, and guides along which the head carrier is moved by the cam and follower and which serves to index the transducer head at a number of mutually spaced but generally parallel positions extending transversely across the width of the recording tape. Preferably, the rotary cam comprises a wheel-like member having an annular recess around its outermost periphery, with the edges of such recess defining a pair of complementary, spaced, curved ramp surfaces whose path of curvature is concentric with that of the wheel-like member itself. The cam follower preferably comprises a series of laterally spaced rollers which fit into the said cam recess and ride upon the ramp surfaces, such rollers being mounted upon pins or shafts coupled to a slide or block which in turn is coupled to the transducer mount, certain such roller pins being mounted in fixed position to establish a reference, and others being laterally movable to accurately follow the cam surfaces.

40 Claims, 12 Drawing Figures

POSITIONER APPARATUS FOR TAPE RECORDER HEADS

BACKGROUND OF THE INVENTION

In the past, the most typical practice in tape recorders was to mount the transducer heads in relatively fixed position in which the tape-to-head position was more or less permanently established. Sometimes the heads were not moved at all from such established position during operation, and at other times they were moved only toward and away from the tape, to facilitate tape changes, etc.; in either such case, however, when transducing was to occur the tape and the head always engaged one another in essentially the same position and at the same location relative to the width of the tape. When multi-track operation was desired, the most typical approach was to invert the tape, employing transducer positioning which accessed only one-half (or other such portion) of the tape at any particular time and which covered the other half, or portion, as a result of, in effect, changing the transport position of the tape.

In most recent times, with the advance of technology and the increasingly demanding performance objectives and capabilities presented, particularly in data storage applications, it has become increasingly desirable to provide for multiple-track tape recording systems, with narrow and closely spaced recording tracks.

These events have brought about the need for commensurately precise and reliable multiple-track positioning apparatus for tape heads, since of course each different track must be accessible to the transducer at any desired time, demanding the capability of at least a number of precise, incremental position shifts at desired times while maintaining desired head-to-tape azimuth angles, tape wrap or tape-head contact, etc., and in fact requiring other complexities as well, including for example the ability to move the transducer head orthogonally away from the plane of the tape at desired times, particularly for such operations as tape changes and the like. More particularly still, however, is the requirement for a positioner which not only satisfies all of the foregoing requirements but, in addition, provides for the capability of continuous position changes of randomly changing magnitude laterally with respect to the tape, whereby any of the multiple recording tracks on the tape may in effect be followed, i.e., tracked, by servo control during tape transport, to accommodate a wide variety of possible irregular tape motion relative to the transducer in addition to, and apart from, the mere lengthwise transport of the recording tracks by which transitions are recorded or reproduced, resulting from the inability, as a practical matter, to guide a tape in precisely the same position relative to the head at all times along the length of the tape each time transport occurs, while also providing for interchangeability in tape media.

SUMMARY OF THE INVENTION

In accordance with the present invention, tape recorder transducer-positioning means are provided by which the transducer is mounted and by which it may be moved in a precisely-guided manner transversely, across the width of, a recording tape. The positioning means comprises a carrier for mounting a transducer in relatively fixed position thereupon, elongated guides upon which the carrier moves transversely of the tape in continuously-indexed position, cam follower means coupled to the transducer carriage to impart movement thereto along the elongated guides, and a cam having a cam surface engaging the cam follower to move the same upon actuation of the cam.

More particularly considered, the transducer positioning means provided hereby includes a rotary cam having a pair of mutually spaced, complementary ramp faces defining a recess therebetween into which a portion of the cam-follower projects, for bi-directional translational movements of the cam follower in response to movement of the cam. Preferably, the complementary ramp faces are circularly curved, and concentric to the axis of rotation of the rotary cam.

More particularly still, the positioning means provided hereby includes a cam follower having an array of follower elements which project into the aforementioned cam recess and which engage the two spaced camming surfaces defining such recess, such array being laterally elongated generally along a line paralleling the longitudinal axis of the cam recess. Preferably, the projecting cam follower elements comprise rollers which roll along the cam surfaces for minimal frictional contact therewith, with the roller elements mounted upon axles or other such means which are spring-biased away from one another, orthogonally of the camming surfaces, to closely interfit the recess therebetween and to maintain definitive engagement of the cam follower with the camming surfaces, for augmented precision in cam and follower actuation of the transducer carriage along its guide means.

The foregoing provisions and advantageous features of the invention will be more fully understood and appreciated by reference to the following specification setting forth particular embodiments thereof as illustrative of the underlying concepts involved.

DESCRIPTION OF THE PREFERRED EMBODIMENTS

Figure 1:
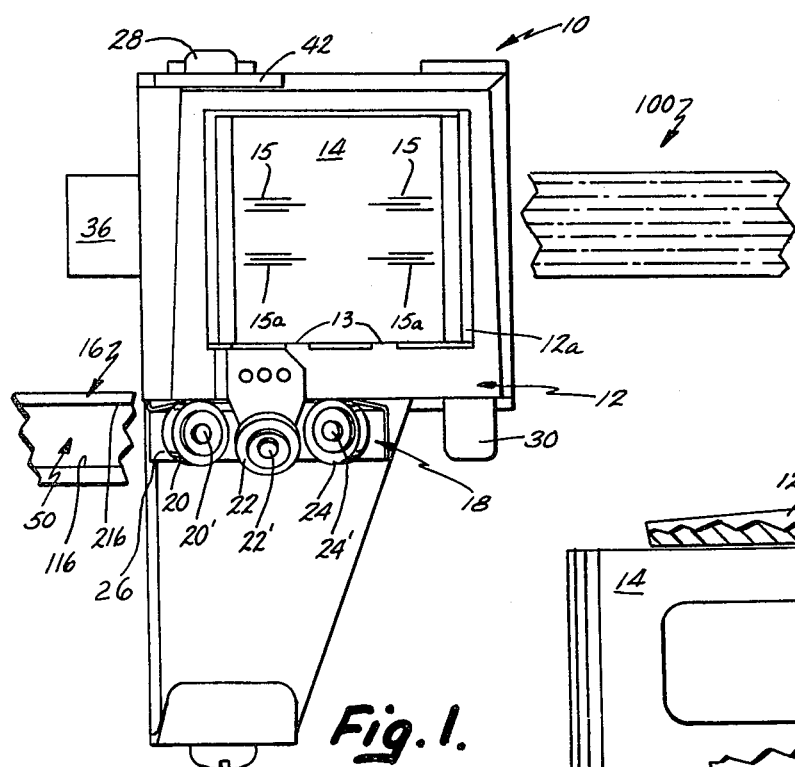
FIG. 1 is front elevation of the present transducer mounting and positioning means, including a fragmentary showing of the cam.
Figure 2:
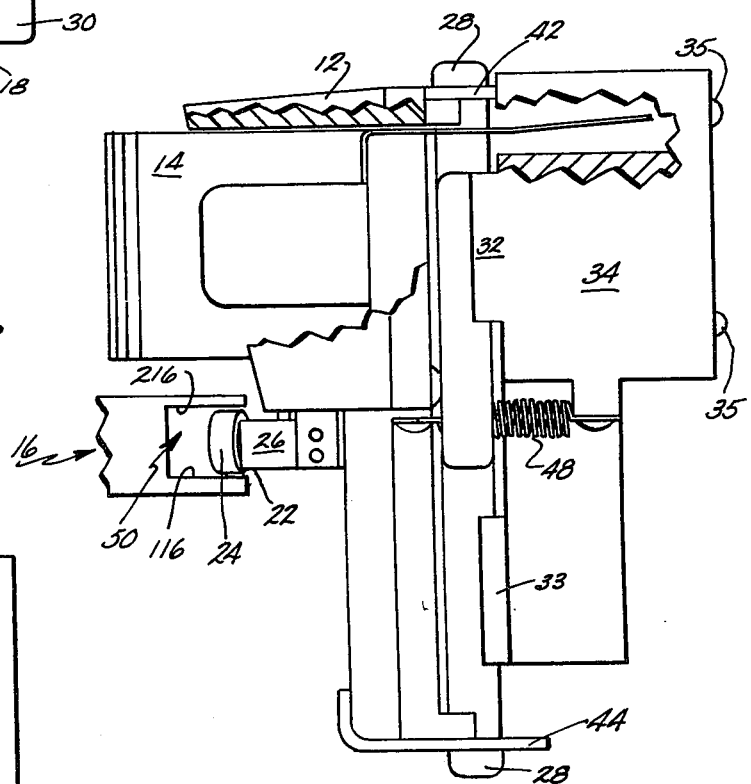
FIG. 2 is a right side elevation of the apparatus shown in FIG. 1.
Figure 3:
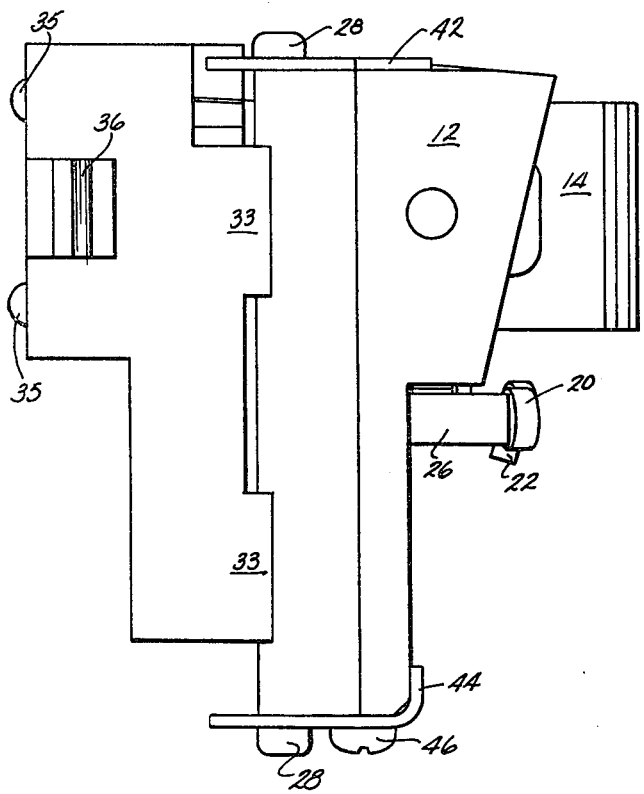
FIG. 3 is a left side elevation of such apparatus, without the cam.

Referring now in more detail to the drawings, the positioner apparatus 10 of the invention may be seen to include a head (transducer) mounting block or receptacle 12 which, in effect, comprises a carriage by which the head 14 may be moved across the width of the recording tape, i.e., vertically with respect to the orientation shown in FIGS. 1-3, inclusive. Such movement is initiated by control of a rotary cam 16, whose rotary motion is imparted to, and translated by, a cam follower apparatus 18 preferably comprising an array of roller elements 20, 22, and 24 mounted upon corresponding pins or axles 20', 22', and 24', which in turn are mounted in a mounting block 26 disposed immediately beneath, and connected to, the head carrier 12.

The head carrier 12 receives the transducer head 14 within a defined recess 12a and indexes the head upon appropriate seats 13 (FIG. 1) which serve to establish the basic position of the head 14, and of its pole pieces 15, 15a, the head being secured within the head carrier in any desired conventional manner.

The carrier 12 and its fixedly mounted head 14 are slideable vertically (as shown in FIGS. 1, 2, and 3) upon a pair of vertically disposed, generally parallel, elongated guide members 28 and 30, which preferably comprise rigid lengths of rod stock, for example steel, which may be coated with low-friction lubricious material, for example that sold under the trademark "EMRALON". Sliding motion of the head carrier 12 upon the guides 28 and 30 may be accomplished by a V-block 32 which is part of, or secured to, an anchor block 34 by which the entire positioner device may be mounted upon a desired support surface. The anchor block may include, for example, indexing projections 35 which are used to locate or position the anchor block by indexing against a support surface, and the anchor block may include an adjustment bracket 36 by which a bolt or other mechanical fastener which engages the support structure may be used to set the azimuth for the head. The rear surface 38 of head carrier 12 may include slider projections 40 for contacting the forward edge of guide bar 30 in vertical movement of the head carrier along such surface, with the head carrier indexed with respect thereto. In this connection, the V-block 32 serves to locate and index guide bar 30, and the same is true of a pair of spaced V-blocks 33 which locate and index guide bar 28, which as illustrated are considerably longer than guide bar 30 to provide two spaced points of support therefor and, with V-block 32, determine a plane in which the guide bars are mounted. In both instances, the guide bars are rigidly secured in their respective V-blocks by use of any desired conventional means.

As illustrated, the head carrier 12, with its transducer head 14 and other associated structure (including the cam follower 18) is mounted upon the anchor block 34 by means of upper and lower retainer plates 42 and 44, respectively, secured to the top and bottom of the carrier 12 by appropriate means such as cap screws 46 or the like, each having an aperture therethrough which is aligned concentrically with the longer guide element 28, and which receives the latter.

Figure 5:
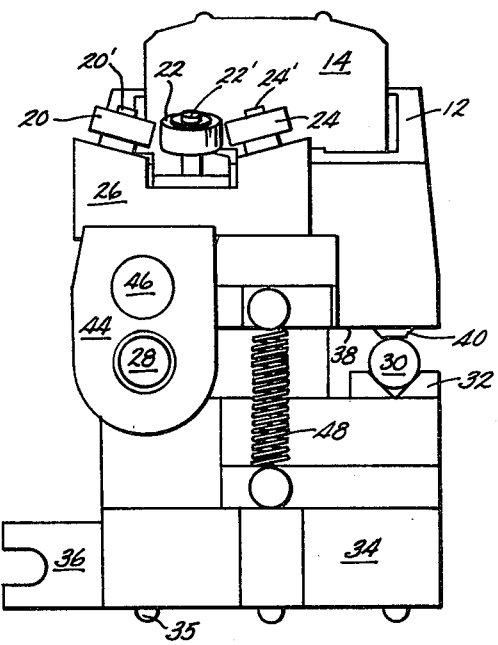
FIG. 5 is a bottom plan view thereof.

Thus, it will be appreciated that head carrier 12 may slide vertically along guide bar 28 with plates 42 and 44 moving longitudinally thereof, and the head carrier may under some circumstances, pivot with respect to anchor block 34 by rotation of plates 42 and 44 upon guide bar 28. When such pivoting motion occurs, the rear surface 38 of the head carrier, and the slider pad 40 thereof, move away from, and back toward, guide bar 30, against which slider pad 40 lightly rests in the normal indexed position of the head carrier and of the transducer head. Such indexing contact is normally maintained by a tension spring 48 (FIGS. 2 and 5) extending between anchor block 34 and the pivotally mounted head carrier 12.

Figure 7:
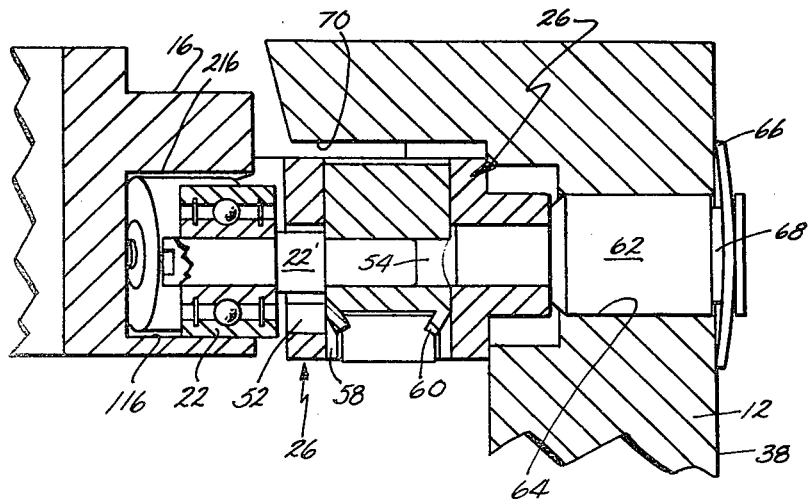
FIG. 7 is an enlarged, fragmentary sectional elevation taken along the plane VII—VII of FIG. 6, showing further details of the structure thereof.
Figure 6:
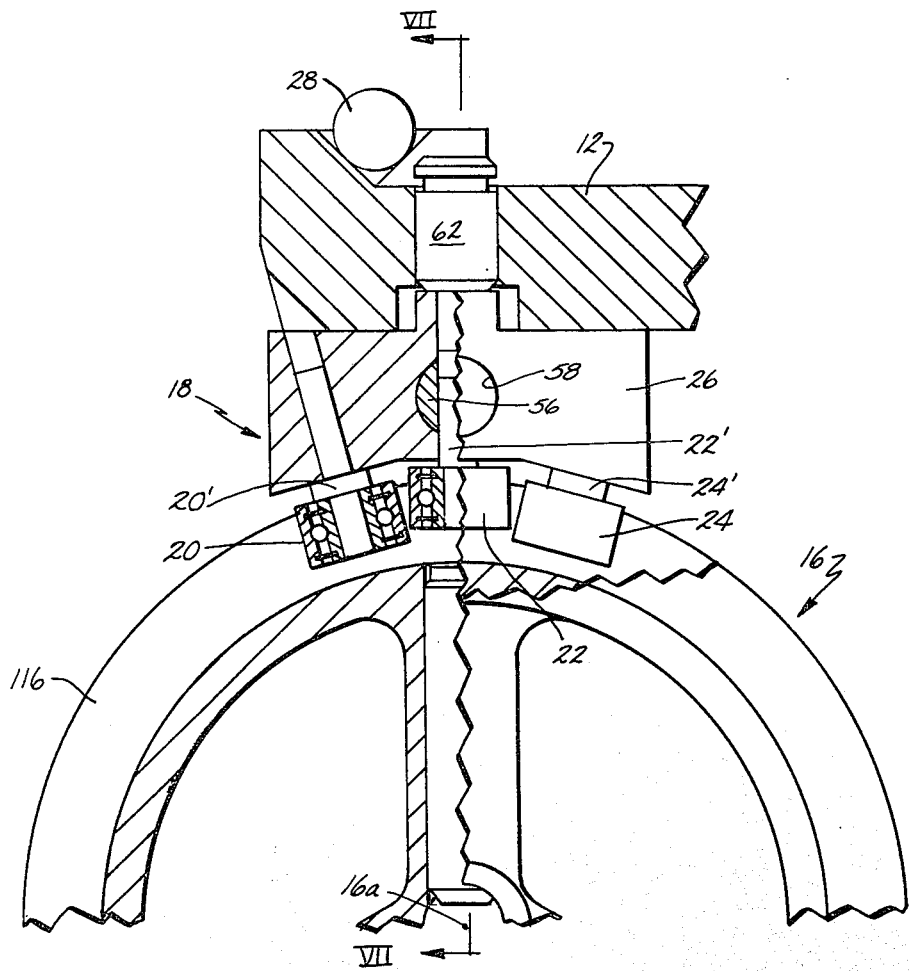
FIG. 6 is an enlarged, fragmentary sectional plan view of the cam and a first form of the cam follower.
Figure 8:
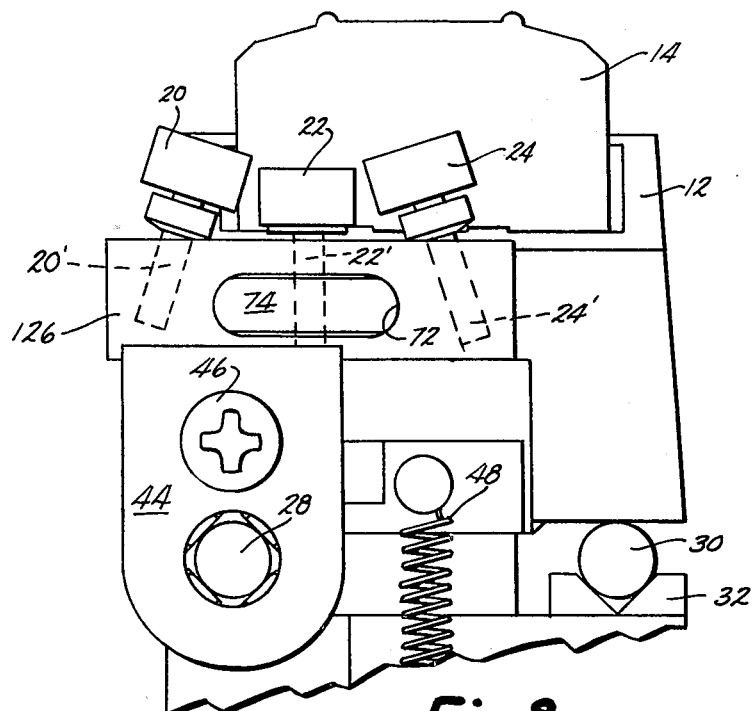
FIG. 8 is a fragmentary, bottom plan view similar to FIG. 5 but showing an alternative embodiment of portions of the cam follower.

The rotary cam 16 showed fragmentarily in FIGS. 1 and 2 is shown in more detail in FIGS. 6 and 7, as is a first embodiment of the cam follower 18. With reference to all such Figures, it will be seen that the cam 16 comprises a wheel-like device having a central axis of rotation 16a and an annular periphery defining a pair of circularly curved, complementary ramp surfaces 116 and 216 which, between them, define an annular recess 50.

Cam follower roller elements 20, 22, and 24 project into the annular, peripheral cam recess 50, which arrangement is facilitated by placing the axes of the mounting pins or axles 20', 22', and 24' for the respective roller elements at diverging angles with respect to one another, to thereby position the roller elements generally along a circularly curved path. The axes of mounting pins 20' and 24' are disposed in a common plane, and these mounting pins are received within closely fitting passages (FIG. 6), but the central roller pin or axle 22' is preferably mounted in a different manner, and has a different orientation.

Cam follower roller axle 22' is in effect spring loaded laterally away from the common plane of axles 20' and 24', such that the two end rollers 20 and 24 will ride upon the upper cam surface 216, but the center roller element 22 will ride upon the lower cam face 116, and there will be at least a small amount of spring force holding the respective rollers in such engagement, for very accurate tracking of the complementary curved-ramp cam faces 116 and 216.

More particularly, a first embodiment for such a mounting arrangement is illustrated in FIGS. 6 and 7, from which it may be seen that roller axle 22' passes through a vertical slot 52 (FIG. 7) in the face of mounting block 26, rather than being seated firmly in a similarly sized bore or passage; thus, axle 22' may move vertically within slot 52. The rear portion of axle 22' is snugly fitted into a central passage 54 in a vertically movable piston 56, which fits closely within a complementary bore or passage 58 extending vertically through mounting block 26, under slight upward spring-biasing from a spring 60 secured in place in the bottom of passage 58.

As will be appreciated, this arrangement provides for spring-biased vertical reciprocatory movements of the roller axle 22', and of its roller 22, with respect to the mounting block 26; however, roller axle 22' is precluded from any other motion with respect to block 26, such as lateral (horizontal) or angular motion.

Rotation of the entire mounting block 26 with respect to the head carrier 12 is provided for, however, by securing the mounting block to the head carrier upon a cylindrical stud or post 62 extending through a slideably interfitted bore 64 which extends through the head carrier 12, opening outwardly through the rear side 38 of the head carrier. At that point, the pivot stud 62 is yieldably retained by a spring clip 66 which seats into an appropriate annular groove 68 formed in the mounting post.

By this arrangement, the entire cam follower 18 including mounting block 26, may rotate to at least a limited extent with respect to the head carrier 12 (limited by clearance between the top of mounting block 26 and a projecting ledge portion 70 [FIG. 7]) of the head carrier, beneath which the mounting block fits. At the same time, the cam follower, including the mounting block 26 and its mounting stud or post 62, may undergo limited spring-biased movement with respect to transducer carriage block 12, by flexure of the spring clip 66.

A conceptually related but structurally differing preferred embodiment of the motion-permitting "floating" cam follower 18 is illustrated in FIGS. 8, 10, 11 and 12, wherein the modified form of mounting block is designated by the numeral 126. As seen there, a similar array of rollers 20, 22, and 24 is utilized to track the opposed ramp surfaces of the cam, and as in the case of the previous structure, the mounting pins or axles 20' and 24' for the two end rollers 20 and 24 are non-movably seated in corresponding bores within the mounting block 126; however, the mounting pin or axle 22' for the center roller 22 is differently housed in its mounting block 126.

More particularly, it will be observed that the underside of mounting block 126 defines an elongated opening 72 (FIGS. 8 and 10), and within that opening is disposed an elongated leaf spring 74.

Figure 12:
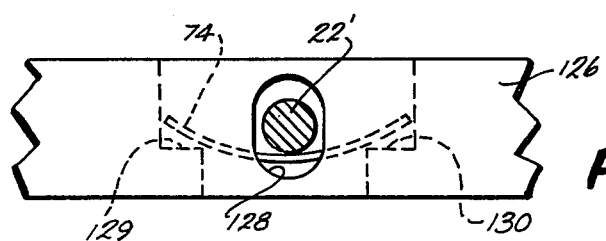
FIG. 12 is a fragmentary sectional elevation taken through the plane XII—XII of FIG. 10.

Unlike mounting block 26, mounting block 126 does not incorporate the complexities of a spring loaded plunger or piston 56 and a separate spring loaded mounting stud or post 62 to obtain a desired degree of relative motion between the cam follower mounting block and the head carrier 12. Instead, mounting block 126 in effect floats with respect to roller element axle 22', which passes freely through block 126 and is fixed (e.g., press-fitted or otherwise secured) into head carrier 12. Relative motion, by way of vertical pivoting movement, is provided for mounting block 126 by a vertical slot-like passage 128 in block 126 (FIG. 12), through which roller axle 22' extends. Slot 128 is vertically elongated adjacent roller 22 but narrows to a generally circular aperture 128a (FIG. 11) at its rear side adjacent the face of head carrier 12. This arrangement provides for block 126 to move upwardly and downwardly with respect to the head carrier 12 over a defined range. Such motion is resisted, and resiliently biased, by the aforementioned leaf spring 74, against whose center portion the mid-portion of axle 22' bears, in a downward direction, i.e., leaf spring 74 biases the rearward extremity of axle shaft 22' in an upward direction (FIG. 12), thus providing for spring-biased angularly floating movement of mounting block 26, and of cam follower rollers 20 and 24 mounted therein, with respect to head carrier 12. Leaf spring 74 is self-retained, its ends resting upon ledges or shoulders 129, 130 inside mounting block 126 (FIG. 12).

The cam follower structures described above provide for precise following of the complementary cam surfaces 116 and 216 of rotary cam 16 in both directions of its possible motion, since the arrangement provides a three-point engagement of the two spaced cam surfaces by a cam follower element which in effect is elongated in the direction of the cam surfaces but which rolls along the latter with very low friction. The spring-loading between the different roller element axles serves to develop a force between them which is applied to the cam surfaces, to maintain sure and certain following thereof, without excessive loading of the cam and its actuating motor (not specifically shown), as would be obtained, for example, by providing a single cam surface and biasing a follower against that single surface with spring force or the like. Thus, less torque is required to rotate the cam, providing for less power consumption, lower heat production, and lower-inertia head positioning.

Figure 9:
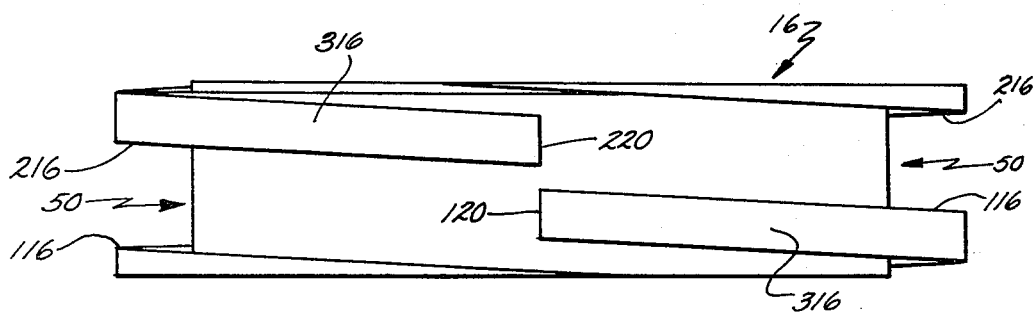
FIG. 9 is an enlarged side elevation of the cam.
Figure 10:
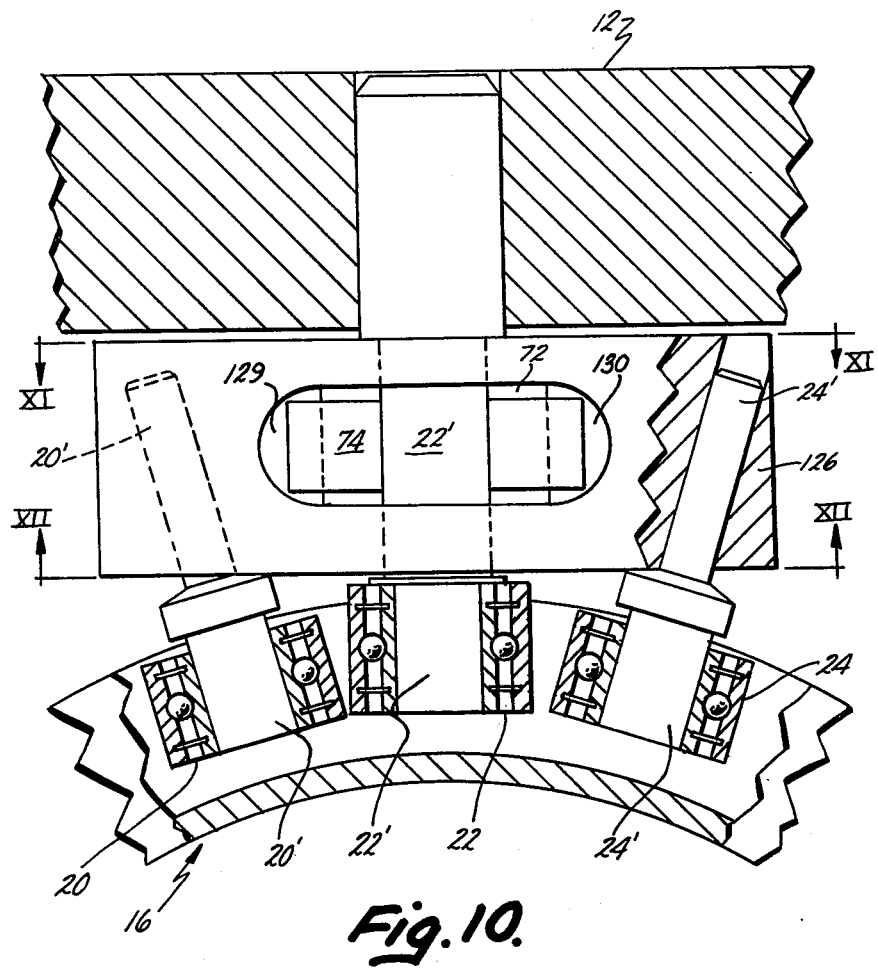
FIG. 10 is an enlarged, fragmentary sectional plan view similar to FIG. 6, but showing further details of the structure shown in FIG. 8.
Figure 11:
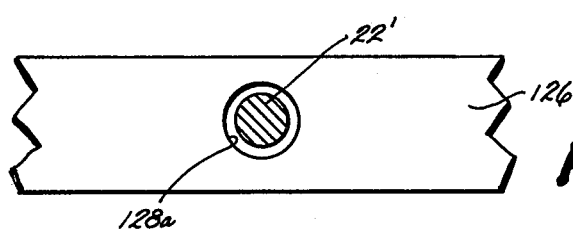
FIG. 11 is a fragmentary sectional elevation taken through the plane XI—XI of FIG. 10.

As illustrated in FIG. 9, cam 16 preferably has its two spaced ramp surfaces 116 and 216 defined by a helically-extending rib-like member 316, whose two end portions 120 and 220 terminate generally adjacent one another. End portions 120 and 220 define stop positions which, at the extremes of cam rotation, contact the nearest cam follower roller in a directly abutting manner, thus limiting the allowable degree of cam rotation and, thus, the allowable degree of transducer movement. Such a feature is very desirable in certain instances, since it can serve as an effective initial positioning device where the particular position of the head relative to the tape and its multiple tracks is not known upon initial start-up of a recorder or tape drive embodying the positioning apparatus.

It may be seen that in accordance with the preferred structure disclosed herein, continuous control over head position is provided, permitting both very small and relatively large magnitudes of head position adjustment accompanied by continuous retention of adjusted position. At the same time, the motion of the head itself is along a precisely guided transducing plane which maintains an established transducing relationship with the plane in which the tape is transported pass the face of the head. Notwithstanding this, movement of the head away from this established transducing angle, and position, may be accomplished at any desired time by pivoting of the head and its mounting block 12 upon the elongated guide 28, an arrangement providing for precise re-establishment of the transducing position by reverse pivoting motion which brings the mounting block 12 back into contact with the other guide member 30.

Figure 4:
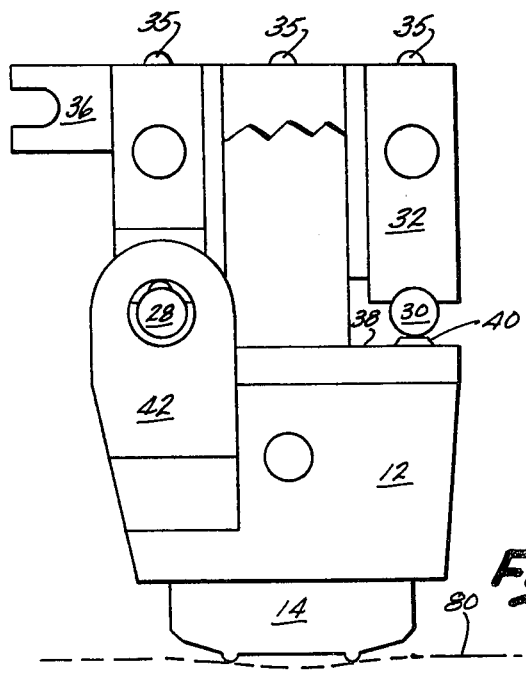
FIG. 4 is an overhead plan view thereof.

In accordance with the foregoing, it will be seen that the guide bars 28 and 30 provide a pair of generally parallel, elongated guide means which are disposed generally parallel to the plane in which the tape is transported (indicated at 80 in FIGS. 3 and 4) and which extend transversely with respect to the tape. The axis of rotation of the cam 16 will also be seen to be generally parallel with the plane of the tape, and to the elongated guide bars, which are of course generally parallel to one another and preferably aligned in a plane parallel to that of the tape. The attachment plates 42 and 44 for the head carrier 12 thus in effect comprise retainer means which will allow some degree of pivoting or hinging motion, and of course such mounting plates also provide for sliding motion of the head carrier along guide bar 28, which thus provides an axis disposed generally parallel to the plane of the tape, oriented transversely of the path of tape motion. Thus, the retainer plates 42 and 44 provide a movable coupling between the head carrier and the fixed linear slide 28, as well as the fixed linear slide 30. It will be appreciated that the elongated guide bars 28 and 30, being continuously aligned along their lengths with the tape and with each other, thus serve to provide (with the corresponding slide surfaces on the head carrier 12) an indexing means which defines a plurality of reference surfaces at mutually spaced positions along a path which is located parallel to but which extends transversely of the path of tape transport. By indexing the head carrier 12 in this manner, the pole pieces 15, 15a, of the transducer head 14 may be placed in transducing relation with respect to the tape (indicated pictorially at 100 in FIG. 1 and understood to occupy the general plane, or position, designated 80 in FIG. 4). In accordance herewith, the tape head 14 may in fact comprise a multiple-gap head, whose pole pieces 15, 15a actually comprise a series of different transducing "gaps", each of which may access one or more of the different recording tracks indicated schematically in FIG. 1 by the dashed lines on the tape 100. Because of its complementary pair of cam surfaces, the cam 16 is double-acting in nature, and with its cam follower comprises a bi-directional motion translator which will move the recording head in either of two possible directions with equal facility and precision. Because of its complementary, mutually spaced cam surfaces, the cam 16 may in a sense be considered a spool element. The fixed cam follower portions represented by rollers 20 and 24 and their respective support pins or axles define reference surfaces which in and of themselves unyieldingly engage one of the cam ramp surfaces, and which are maintained in engagement therewith by the movable, spring-biased cam follower roller 22 and its respective axle or mounting post 22'.

It is to be understood that the foregoing description of a preferred embodiment of the invention is provided for purposes of the description and illustration, and not as a measure of the invention, whose scope is to be defined by reference to the ensuing claims. Thus, while those skilled in the art may devise embodiments of the particular concepts presented in the foregoing illustrative disclosure which differ somewhat from the particular embodiments shown and described in detail herein, or may make various changes in structural details to the illustrated embodiment, all such alternative or modified embodiments which utilize the concepts of the invention and clearly incorporate the spirit thereof are to be considered as within the scope of the claims appended herebelow, unless such claims by their language, specifically state otherwise.

The embodiments of the invention in which an exclusive property or privilege is claimed are defined as follows:

1. Tape recorder transducer positioning means for mounting, moving and guiding the movements of a transducer head transversely with respect to the longitudinal axis of a recording tape, comprising in combination: a carrier for mounting a transducer in relatively fixed position thereupon, and a transducer mounted thereupon; an anchor member having means for securing same in fixed position upon a given support surface; means defining at least a pair of generally parallel elongated guide surfaces disposed generally adjacent and parallel to said tape and having axes disposed transversely with respect to the longitudinal axis of said tape, said guide surfaces being supported upon at least one of said carrier and said anchor block, and slidably engaging the other thereof, means for normally maintaining said carrier and said anchor block in contact with said elongated guide surfaces; cam follower means coupled to said carrier to move the carrier and the transducer mounted thereupon longitudinally along said elongated guide surfaces upon cam actuation of the follower means; and a cam means disposed in alignment with said follower means for engaging the same upon cam movement to thereby move the follower means, the carrier and the transducer along said guide surfaces, generally parallel to said tape and width-wise with respect thereto.

2. The transducer positioning means as defined in claim 1, wherein said cam means comprises a rotary cam having a curved ramp face.

3. The transducer positioning means as defined in claim 2, wherein said rotary cam has an axis of rotation generally parallel to said elongated guide means.

4. The transducer positioning means as defined in claim 2, wherein said cam means includes a pair of mutually spaced curved ramp faces, said ramp faces defining a space therebetween and said cam follower means including at least one projecting portion disposed at least partially within said space.

5. The transducer positioning means as defined in claim 4, wherein said projecting portion rides upon at least one of said curved ramp faces.

6. The transducer positioning means as defined in claim 5, wherein said cam follower means includes at least a pair of said projecting portions, each such portion disposed at least partially within said space and each riding upon at least one of said curved ramp faces.

7. The transducer positioning means as defined in claim 6, wherein said projecting portions in said pair thereof ride upon opposite ones of said spaced curved ramp faces.

8. The transducer positioning means as defined in claim 7, wherein said cam follower means includes at least three of said projecting portions, all three of said projecting portions being disposed at least partially within said space, two of said projecting portions engaging one of said curved ramp faces and the other such projecting portion engaging the other of said curved ramp faces.

9. The transducer positioning means as defined in claim 8, wherein said rotary cam has an axis of rotation generally parallel to said elongated guide means.

10. The transducer positioning means as defined in claim 5, wherein said projecting portion comprises a roller element having a surface which rides upon said ramp face.

11. The transducer positioning means as defined in claim 8, wherein said three projecting portions each comprise a roller element having a surface which engages said respective ramp faces.

12. The transducer positioning means as defined in claim 1, wherein said means for normally maintaining said carrier and said anchor block in contact with said elongated guide surfaces comprises a resilient biasing member.

13. A movably guided carrier means for mounting a tape recorder transducer and moving the same across the width of the tape to access each of a plurality of generally parallel tracks extending along said tape, comprising, in combination: a transducer carrier member, said member having a transducer-mounting face disposed generally adjacent the path of said tape, and having at least one side portion, said side portion carrying at least a pair of linearly-aligned slide surfaces disposed along an axis generally parallel to, and oriented transversely of, the path of tape motion; a fixed linear slide and means for mounting same in registering parallel alignment with said linearly-aligned slide surfaces carried by said carrier member side portion; means defining a movable coupling between said carrier member and said fixed linear slide, for allowing movement of the carrier member into and out of longitudinal sliding contact with said slide; and means for moving said carrier member and a transducer mounted thereupon along said linear slide, transversely with respect to said tape.

14. The transducer positioning means as defined in claim 13, wherein said movable coupling includes a hinge means.

15. The transducer positioning means as defined in claim 14, including means for spring-biasing said hinge means in one direction of hinging movement.

16. A transducer positioner means for mounting the tape head of a tape recorder in a position adjacent the tape and moving the transducer head transversely with respect to the tape to access separate side-by-side recording tracks which extend lengthwise along the tape, said positioner means comprising, in combination: indexing means defining a plurality of reference surfaces at mutually spaced positions disposed along a path located generally transversely of the tape; a mounting member for receiving and holding a transducer in secured relation thereupon; said mounting member having locating surfaces for complementary engagement with said reference surfaces at each of said mutually spaced positions; said complementary engagement of said reference surfaces and said locating surfaces serving to position a transducer received and held upon said mounting member in transducing relationship with said tape at each of a plurality of mutually spaced positions across the width of the tape; and means for moving said mounting member to move said locating surfaces from one to another of said mutually spaced positions.

17. The transducer positioner means as defined in claim 16, wherein said means for moving said mounting member includes a cam and a cam follower apparatus, said apparatus being positioned generally adjacent said path of reference surface positions and arranged to apply motion-imparting forces to said mounting member along an axis generally parallel to such path.

18. The transducer positioner means as defined in claim 17, wherein said cam and cam follower are double-acting and comprise a bi-directional motion translator for moving said mounting member in either direction along said axis.

19. The transducer positioner means as defined in claim 17, wherein said cam comprises a rotary member having a circumferentially-disposed curved ramp surface.

20. The transducer positioner means as defined in claim 19, wherein said rotary member comprises a spool having a pair of mutually spaced complementary curved camming surfaces adapted to receive a cam follower therebetween.

21. A positioner apparatus for moving a recording transducer from one to another of a plurality of different positions mutually spaced along an axis adjacent a recording media, comprising: a rotary cam having a circumferentially extending, curved cam surface with continuously-sloping, non-stepped camming portions for importing non-stepped gradual movement to a cam follower engaged therewith; and cam follower means engaging said cam surface and engageable with said continuously-sloping non-stepped camming portions to follow along same upon cam rotation thereby moving said follower means generally orthogonally with respect to said cam surface in gradual, non-stepped movements; means for coupling said cam follower means to a transducer to move the transducer correspondingly in response to said movement of said cam follower means; and means for guiding said transducer to move along said position axis in response to said movement by said cam follower means.

22. The positioner apparatus as defined in claim 21, wherein said rotary cam comprises a wheel-like member and said camming portions comprise a gradually and progressively-curved ramp surface which is generally concentric with said wheel-like member.

23. The positioner apparatus as defined in claim 22, wherein said wheel-like member has a pair of mutually spaced such curved ramp surfaces of generally complementary configuration, said ramp surfaces defining a recess therebetween for receiving said cam follower means such that either of said ramp surfaces may engage said cam follower means to move the same.

24. The positioner apparatus as defined in claim 23, wherein said cam follower means comprises an array of projecting portions carried by a commonly-shared mount, said array being laterally elongated along an axis of elongation which is generally parallel to the longitudinal axis of said recess between said ramp surfaces.

25. The positioner apparatus as defined in claim 24, wherein said cam follower projecting portions comprise a series of pin-like members.

26. The positioner apparatus as defined in claim 25, wherein at least certain of said pin-like members comprise axles, said axles carrying roller members which engage and ride upon said complementary ramp surfaces.

27. The positioner apparatus as defined in claim 25, wherein at least one of said pin-like members includes mounting structure for movement of that respective pine-like member in a direction generally orthogonal to the longitudinal axis of said recess between said ramp surfaces, for enhanced following thereof by said movably mounted pin-like member.

28. The positioner apparatus as defined in claim 27, wherein said mounting structure comprises means for mounting said pin-like member for axial shifts of movement to a plurality of different generally co-planar positions.

29. The positioner apparatus as defined in claim 28, wherein said cam follower means includes position-referencing portions cooperatively engaging said recess between said ramp surfaces with said movably mounted pin-like member.

30. Cam and cam follower means for imparting track-changing movements to a recording transducer in a multitrack recording apparatus, comprising: a cam having a pair of mutually spaced, opposed, complementary cam surfaces defining a recess therebetween; and a cam follower having a laterally elongated follower means disposed in said recess and elongated in the direction of said recess; said follower means comprising an array of projecting portions carried by a common mount.

31. The cam and cam follower means as defined in claim 30, wherein certain of said projecting portions are movable with respect to other such portions in a direction generally orthogonally with respect to said cam recess.

32. The cam and cam follower means as defined in claim 31, wherein said cam follower projecting portions comprise a series of pin-like members.

33. The cam and cam follower means as defined in claim 32, wherein at least one of said pin-like members includes mounting structure for movement of that respective pin-like member in a direction generally orthogonal to the longitudinal axis of said recess between said cam surfaces, for enhanced following thereof by said movably mounted pin-like member.

34. The cam and cam follower means as defined in claim 33, wherein said mounting structure comprises means for mounting said pin-like member for axial shifts of movement to a plurality of different generally co-planar positions.

35. The cam and cam follower means as defined in claim 34, wherein said cam follower means comprises position-referencing portions cooperatively engaging said recess between said cam surfaces with said movably mounted pin-like member.

36. The cam and cam follower means as defined in claim 35, wherein at least certain of said pin-like members comprise axles, said axles carrying roller members which engage and ride upon said complementary cam surfaces.

37. The cam and cam follower means as defined in claim 36, wherein said cam comprises a rotary member and said pair of mutually spaced cam surfaces comprise longitudinally curved and circumferentially extending cam faces defining a recess therebetween and disposed on the periphery of said rotary member.

38. The cam and cam follower means as defined in claim 37, wherein said rotary cam comprises a wheel-like member having said recess defined annularly around the curved peripheral edge thereof, said cam surfaces comprising longitudinally curved complementary ramps facing one another across said recess and defining the side portions thereof.

39. The transducer positioning means as defined in claim 1, wherein said cam means comprises a cam member having at least one cam surface which includes continuously sloping ramp portions for imparting gradual movement to said cam follower means and said transducer.

40. The transducer positioning means as defined in claim 39, wherein said cam means comprises a rotary cam and said continuously sloping ramp portions comprise curved surfaces on said rotary cam.

* * * * *